(12) United States Patent
Feng et al.

(10) Patent No.: US 11,788,160 B2
(45) Date of Patent: Oct. 17, 2023

(54) CONVERTER CO2—O2 MIXED INJECTION SMELTING METHOD AND METHOD OF DYNAMICALLY CONTROLLING FIRE POINT AREA TEMPERATURE

(71) Applicant: University of Science and Technology Beijing, Beijing (CN)

(72) Inventors: Chao Feng, Beijing (CN); Rong Zhu, Beijing (CN); Guangsheng Wei, Beijing (CN); Baochen Han, Beijing (CN); Kai Dong, Beijing (CN); Xueliang Wang, Beijing (CN); Wenhe Wu, Beijing (CN); Shaoyan Hu, Beijing (CN); Weifeng Li, Beijing (CN); Juanjuan Jiang, Beijing (CN); Jianfeng Dong, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 498 days.

(21) Appl. No.: 17/049,449

(22) PCT Filed: Jan. 21, 2020

(86) PCT No.: PCT/CN2020/073500
§ 371 (c)(1),
(2) Date: Oct. 21, 2020

(87) PCT Pub. No.: WO2021/073015
PCT Pub. Date: Apr. 22, 2021

(65) Prior Publication Data
US 2022/0340986 A1  Oct. 27, 2022

(30) Foreign Application Priority Data
Oct. 16, 2019 (CN) .......................... 201910984480.2

(51) Int. Cl.
*C21C 5/32* (2006.01)
*C21C 5/46* (2006.01)

(52) U.S. Cl.
CPC .............. *C21C 5/32* (2013.01); *C21C 5/4673* (2013.01)

(58) Field of Classification Search
None
See application file for complete search history.

(56) References Cited

U.S. PATENT DOCUMENTS

2018/0163280 A1   6/2018  Dengel et al.

FOREIGN PATENT DOCUMENTS

| CN | 101250606 A | 8/2008 |
| CN | 101608250 A | 12/2009 |

(Continued)

OTHER PUBLICATIONS

International Search Report in International Appln. No. PCT/2020/073500, dated Jul. 16, 2020, 8 pages.

*Primary Examiner* — Scott R Kastler
(74) *Attorney, Agent, or Firm* — Fish & Richardson P.C.

(57) ABSTRACT

The present disclosure provides a converter $CO_2$—$O_2$ mixed injection smelting method and a fire point area temperature dynamic control method. The method realizes online monitoring through an infrared temperature sensor installed inside an oxygen lance, dynamically adjusts the mixing ratio of $CO_2$ and $O_2$ and the height of the oxygen lance position according to the fire point area temperature changes and process requirements in different smelting stages, so that the secondary smelting system interlockingly and dynamically controls the fire point area temperature and the molten pool heating rate.

18 Claims, 2 Drawing Sheets

(56) References Cited

FOREIGN PATENT DOCUMENTS

| | | | | |
|---|---|---|---|---|
| CN | 108330242 A | * | 7/2018 | ............... C21C 5/32 |
| CN | 108165700 A | | 8/2018 | |
| CN | 108359766 A | | 8/2018 | |
| CN | 108796163 A | | 11/2018 | |
| JP | H0633127 A | | 2/1994 | |
| JP | 2003-328021 | | 11/2013 | |

* cited by examiner

US 11,788,160 B2

CONVERTER CO2—O2 MIXED INJECTION SMELTING METHOD AND METHOD OF DYNAMICALLY CONTROLLING FIRE POINT AREA TEMPERATURE

CROSS REFERENCE OF RELATED APPLICATIONS

This application is a U.S. National Phase application under 35 U.S.C. § 371 of International Patent Application No. PCT/CN2020/073500, filed on Jan. 21, 2020, which claims the priority of Chinese Patent Application No. 201910984480.2, filed on Oct. 16, 2019, the disclosure of which is incorporated herein by reference in its entirety.

TECHNICAL FIELD

The present disclosure relates to a technical field of iron and steel metallurgy, in particular to a converter $CO_2$—$O_2$ mixed injection smelting method and a method of dynamically controlling a fire point area temperature.

BACKGROUND

A large amount of $CO_2$ emissions is the main cause of greenhouse effect. Every ton of steel produced will emit about 2 tons of $CO_2$. The efficient use of $CO_2$ is of great significance to reduce greenhouse gas emissions. Therefore, it is urgent to develop new technologies and explore new ways to reduce or absorb $CO_2$ emissions in the steel industry.

During the converter smelting process, a high-speed oxygen jet contacts with a molten pool to form a high-temperature fire point area where iron evaporates, which produces a large amount of smoke and dust, causes environmental pollution, increases a heat loss of the converter, and decreases a metal yield. Therefore, how to dynamically adjust and control the fire point area temperature is of great significance for reducing the production of smoke and dust in steelmaking and improving the metal yield and heat energy utilization. However, there is still no effective method to realize continuous monitoring of the fire point area temperature, and to realize a dynamic adjustment of the fire point area temperature according to the fire point area temperature and smelting requirements.

The reaction between $CO_2$ and [C] is an endothermic reaction (which is mainly limited by the temperature and concentration of [C]), and generates 1.2-2 times of CO bubbles, which may not only reduce the temperature of the fire point area and realize the conversion of mass and energy, but also enhance the stirring of the molten pool. $CO_2$ is one of the cleanest coolants. How to achieve precise and effective control of the fire point area temperature by dynamically adjust the mixing ratio of $CO_2$ is of great significance for reducing the converter smelting cost, increasing the metal yield, and enhancing the smelting process flexibility.

SUMMARY

Embodiments of the present disclosure provide a converter $CO_2$—$O_2$ mixed injection smelting method and a method of dynamically controlling a converter $CO_2$—$O_2$ mixed injection smelting fire point area temperature, which may dynamically adjust the temperature of the converter smelting fire point area and the heating rate of the molten pool, realize efficient utilization of $CO_2$ and molten pool energy, and reduce the production of smoke and dust in steelmaking.

According to the method provided in the embodiments of the present disclosure, an infrared thermometer is installed inside an oxygen lance. The infrared thermometer is connected to a data processing system, the data processing system is connected to a secondary smelting system, the secondary smelting system is connected to a $CO_2$ flow regulating valve, an $O_2$ flow regulating valve and an oxygen lance control system, and the oxygen lance is connected to a thermometer protection system and an oxygen lance cooling system.

The embodiments of the present disclosure provide a converter $CO_2$—$O_2$ mixed injection smelting method, wherein a converter $CO_2$—$O_2$ mixed injection smelting process includes a smelting beginning stage, a heating and slagging stage, an early efficient dephosphorization stage, a rapid decarburization stage, and an endpoint control stage. The converter $CO_2$—$O_2$ mixed injection smelting method includes:

measuring a fire point area temperature in each of the smelting beginning stage, the heating and slagging stage, the early efficient dephosphorization stage, the rapid decarburization stage and the endpoint control stage, so as to control the fire point area temperature and dynamically adjust a $CO_2$ mixing ratio.

In one embodiment, the method includes: in the smelting beginning stage, measuring the fire point area temperature $T_1$, wherein the fire point area temperature is to be controlled to below $T_2$, and the $CO_2$ mixing ratio is dynamically adjusted based on a difference value $\Delta T$ between $T_1$ and $T_2$; and/or in the heating and slagging stage, measuring the fire point area temperature wherein the fire point area temperature is to be controlled to below $T_2=2800°$ C., and a molten pool heating rate is to be controlled to within 10-30° C./min, and dynamically adjusting the $CO_2$ mixing ratio in real time based on the difference value $\Delta T$ between $T_1$ and $T_2$ and on a heat balance, wherein in response to the difference value $\Delta T$ changing by 10° C., the $CO_2$ mixing ratio is adjusted by 0.5-2.0%; and/or in the early efficient dephosphorization stage, measuring the fire point area temperature, wherein the fire point area temperature is to be controlled to below 2700° C., and the molten pool heating rate is to be controlled to within 5-18° C./min, and dynamically adjusting the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.35-1.8%; and/or in the rapid decarburization stage, measuring the fire point area temperature wherein the fire point area temperature is to be controlled to below $T_2=2700°$ C., and the molten pool heating rate is to be controlled to within 24-40° C./min, and dynamically adjusting the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.3-1.6%; and/or in the endpoint control stage, measuring the fire point area temperature wherein the fire point area temperature is to be controlled to below $T_2=2800°$ C., and the molten pool heating rate is to be controlled to within 14-30° C./min, and dynamically adjusting the $CO_2$ mixing ratio in real time based on the difference value $\Delta T$ between $T_1$ and $T_2$ and on the heat balance, wherein in response to the difference value ΔT changing by 10° C., the $CO_2$ mixing ratio is adjusted by 0.35-2.0%.

In one embodiment, the converter $CO_2$—$O_2$ mixed injection smelting process further includes a preparation stage; and the converter $CO_2$—$O_2$ mixed injection smelting method further includes:
calculating an addition amount of a slagging agent and a coolant and formulating an addition system through a material balance and heat balance static model according to a fed metal material condition, a slagging agent condition, a coolant condition and a steel tapping target requirement; and/or
subsequent to a metal charging to the converter, lowering an oxygen lance to a specified height below a converter mouth, introducing a flow of $CO_2$ and $O_2$, controlling the flow of $CO_2$ and $O_2$, and measuring the fire point area temperature.

In one embodiment, the converter $CO_2$—$O_2$ mixed injection smelting process further includes an end stage; and the converter $CO_2$—$O_2$ mixed injection smelting method further includes:
lifting the oxygen lance to a certain height below the converter mouth, turning off the flow of $CO_2$ and $O_2$, continuing to lift the oxygen lance to a certain height above the converter mouth, and waiting for a next cycle of operation.

In one embodiment, the converter $CO_2$—$O_2$ mixed injection smelting method includes: rocking the converter for steel tapping after molten steel composition and temperature are analyzed to be qualified.

In one embodiment, the converter $CO_2$—$O_2$ mixed injection smelting method includes installing an infrared thermometer inside the oxygen lance to measure the fire point area temperature.

In one embodiment, the converter $CO_2$—$O_2$ mixed injection smelting method further includes: connecting an infrared thermometer (2-1) to a data processing system (2-2), connecting the data processing system (2-2) to a secondary smelting system (3), connecting the secondary smelting system (3) to a $CO_2$ flow regulating valve (4-3), an $O_2$ flow regulating valve (4-4) and an oxygen lance control system (5), and connecting the oxygen lance (1) to a thermometer protection system (6) and an oxygen lance cooling system (7).

In one embodiment, the metal material condition in the preparation stage includes a weight and temperature of molten iron and scrap steel.

In one embodiment, a gas supply flow of the oxygen lance (1) is 6000-100000 $Nm^3/h$, wherein an $O_2$ concentration is greater than 97%, an $O_2$ mixing ratio is 50-100%, a $CO_2$ concentration is greater than 90%, and a $CO_2$ mixing ratio is 0-50%; and a water flow of the oxygen lance cooling system (7) is 60-600 $m^3/h$.

In one embodiment, the infrared thermometer (2-1) transmits an electrical signal to of 4-20 mA; the infrared thermometer (2-1) has an infrared spectrum of 4-30 μm, a single laser or dual laser sighting form, and a meter outer diameter of 5-40 mm; an angle between an infrared axis and a nozzle-orifice axis of the oxygen lance is 0-70°.

In one embodiment, the thermometer protection system (6) controls a temperature of the infrared thermometer (2-1) to within 0-70° C., a protective gas medium is any one or a mixture of any two or more of $N_2$, Ar and $CO_2$, a protective gas flow is 500-10000 $Nm^3/h$, and a protective gas pipeline inner diameter is 5-200 mm.

In one embodiment, the data processing system (2-2) converts the electrical signal of 4-20 mA into a digital signal.

In one embodiment, the method is applicable to 30-400 t converter $CO_2$—$O_2$ mixed injection smelting.

The embodiments of the present disclosure provide a method of dynamically controlling a converter $CO_2$—$O_2$ mixed injection smelting fire point area temperature, wherein the converter $CO_2$—$O_2$ mixed injection smelting process includes a smelting beginning stage, a heating and slagging stage, an early efficient dephosphorization stage, a rapid decarburization stage and an endpoint control stage.

The method of dynamically controlling the converter $CO_2$—$O_2$ mixed injection smelting fire point area temperature includes: measuring the fire point area temperature in each of the smelting beginning stage, the heating and slagging stage, the early efficient dephosphorization stage, the rapid decarburization stage and the endpoint control stage, so as to control the fire point area temperature and dynamically adjust the $CO_2$ mixing ratio.

In one embodiment, the method further includes installing the infrared thermometer (2-1) inside the oxygen lance (1), wherein the infrared thermometer (2-1) is connected to the data processing system (2-2), the data processing system (2-2) is connected to the secondary smelting system (3), the secondary smelting system (3) is connected to the $CO_2$ flow regulating valve (4-3), the $O_2$ flow regulating valve (4-4) and the oxygen lance control system (5), and the oxygen lance (1) is connected to the thermometer protection system (6) and the oxygen lance cooling system (7), and wherein the method includes one or more of the steps of:
in the smelting beginning stage, measuring the fire point area temperature $T_1$ with the infrared thermometer (2-1), wherein the fire point area temperature is to be controlled to below $T_2$, and transmitting a difference value ΔT between $T_1$ and $T_2$ to the secondary smelting system (3) which dynamically adjusts the $CO_2$ mixing ratio; and/or
in the heating and slagging stage which is 0-3 min of an early smelting stage, measuring the fire point area temperature $T_1$ with the infrared thermometer (2-1), wherein the fire point area temperature is to be controlled to below $T_2$=2800° C., and the molten pool heating rate is to be controlled to within 10-30° C./min, and dynamically adjusting the $CO_2$ mixing ratio in real time by the secondary smelting system (3) based on the difference value ΔT between $T_1$ and $T_2$ and on the heat balance, wherein in response to the difference value ΔT changing by 10° C., the $CO_2$ mixing ratio is adjusted by 0.5-2.0%; and/or
in the early efficient dephosphorization stage which is 3-5 min of the early smelting stage, measuring the fire point area temperature $T_1$ with the infrared thermometer (2-1), wherein the fire point area temperature is to be controlled to below 2700° C., and the molten pool heating rate is to be controlled to within 5-18° C./min, and dynamically adjusting the $CO_2$ mixing ratio in real time by the secondary smelting system (3) based on the difference value ΔT between $T_1$ and $T_2$ and on the heat balance, wherein in response to the difference value ΔT changing by 10° C., the $CO_2$ mixing ratio is adjusted by 0.35-1.8%; and/or
in the rapid decarburization stage which is 5-10 min of a middle melting stage, measuring the fire point area temperature $T_1$ with the infrared thermometer (2-1), wherein the fire point area temperature is to be controlled to below $T_2$=2700° C., and the molten pool heating rate is to be controlled to within 24-40° C./min, and dynamically adjusting the $CO_2$ mixing ratio in real time by the secondary smelting system (3) based on the difference value $\Delta T$ between $T_1$ and $T_2$ and on the heat balance, wherein in response to the difference value $\Delta T$ changing by 10° C., the $CO_2$ mixing ratio is adjusted by 0.3-1.6%; and/or in the endpoint control stage which is 10-16 min of a late smelting stage, measuring the fire point area temperature $T_1$ with the infrared thermometer (2-1), wherein the fire point area temperature is to be controlled to below $T_2$=2800° C., and the molten pool heating rate is to be controlled to within 14-30° C./min, and dynamically adjusting the $CO_2$ mixing ratio in real time by the secondary smelting system (3) based on the difference value $\Delta T$ between $T_1$ and $T_2$ and on the heat balance, wherein in response to the difference value $\Delta T$ changing by 10° C., the $CO_2$ mixing ratio is adjusted by 0.35-2.0%.

In one embodiment, the method of dynamically controlling the converter $CO_2$—$O_2$ mixed injection smelting fire point area temperature further includes:

calculating the addition amount of the slagging agent and the coolant and formulating the addition system by the secondary smelting system (3) through the material balance and heat balance static model according to the fed metal material condition, the slagging agent condition, the coolant condition and the steel tapping target requirement; and/or subsequent to a metal charging to the converter, rocking the converter mouth to a vertical position, turning on the oxygen lance cooling system (7) by the secondary smelting system (3), controlling the oxygen lance control system (5) to lower the oxygen lance to above the converter mouth, turning on the thermometer protection system (6), continuing to lower the oxygen lance to a specified height below the converter mouth, turning on the $CO_2$ flow regulating valve (4-3), the $O_2$ flow regulating valve (4-4) and the infrared thermometer (2-1), and measuring the fire point area temperature with the infrared thermometer (2-1); and/or after an end of blowing, controlling the oxygen lance control system (5) by the secondary smelting system (3) to lift the oxygen lance to below the converter mouth, turning off the $CO_2$ flow regulating valve (4-3), the $O_2$ flow regulating valve (4-4) and the infrared thermometer (2-1), continuing to lift the oxygen lance to above the converter mouth, turning off the thermometer protection system (6), lifting the oxygen lance to an initial standby position, turning off the oxygen lance cooling system (7), and waiting for a next cycle of operation; and/or rocking the converter for steel tapping after the molten steel composition and temperature are analyzed to be qualified.

In one embodiment, the metal material condition in the preparation stage includes the weight and temperature of molten iron and scrap steel.

In one embodiment, the gas supply flow of the oxygen lance (1) is 6000-100000 $Nm^3/h$, wherein the $O_2$ concentration is greater than 97%, the $O_2$ mixing ratio is 50-100%, the $CO_2$ concentration is greater than 90%, and the $CO_2$ mixing ratio is 0-50%; and a water flow of the oxygen lance cooling system (7) is 60-600 $m^3/h$.

In one embodiment, the infrared thermometer (2-1) transmits an electrical signal of 4-20 mA; the infrared thermometer (2-1) has an infrared spectrum of 4-30 μm, a single laser or dual laser sighting form, and a meter outer diameter of 5-40 mm; and an angle between an infrared axis and a nozzle-orifice axis of the oxygen lance is 0-70°.

In one embodiment, the thermometer protection system (6) controls the temperature of the infrared thermometer (2-1) to within 0-70° C., the protective gas medium is any one or a mixture of any two or more of $N_2$, Ar and $CO_2$, the protective gas flow is 500-10000 $Nm^3/h$, and the protective gas pipeline inner diameter is 5-200 mm.

In one embodiment, the data processing system (2-2) converts the electrical signal of 4-20 mA into a digital signal.

BRIEF DESCRIPTION OF THE ACCOMPANYING DRAWINGS

Where, 1: oxygen lance; 2-1: infrared thermometer; 2-2: data processing system; 3: secondary smelting system; 4-1: $CO_2$ gas storage tank; 4-2: $O_2$ gas storage tank; 4-3: $CO_2$ flow regulating valve; 4-4: $O_2$ flow regulating valve; 4-5: $CO_2$—$O_2$ gas mixing device; 5: oxygen lance control system; 6: thermometer protection system; 7: oxygen lance cooling system.

DETAILED DESCRIPTION

In order to make the technical problems to be solved, technical solutions and advantages of the present disclosure more clearly, a detailed description will be given below with reference to the drawings and specific embodiments.

Embodiments of the present disclosure provide a method of dynamically controlling a converter $CO_2$—$O_2$ mixed injection smelting fire point area temperature. According to the method, the fire point area temperature is measured with an infrared thermometer installed inside the oxygen lance, and the $CO_2$ flow and $O_2$ flow are dynamically adjusted according to the change in the fire point area temperature, which realizes the dynamic adjustment of the fire point area temperature and the molten pool heating rate, achieves the efficient use of the energy in the converter smelting process, decreases the consumption of steel materials, and reduces the emissions of steelmaking smoke and dust and the production of slag.

Figure 1:
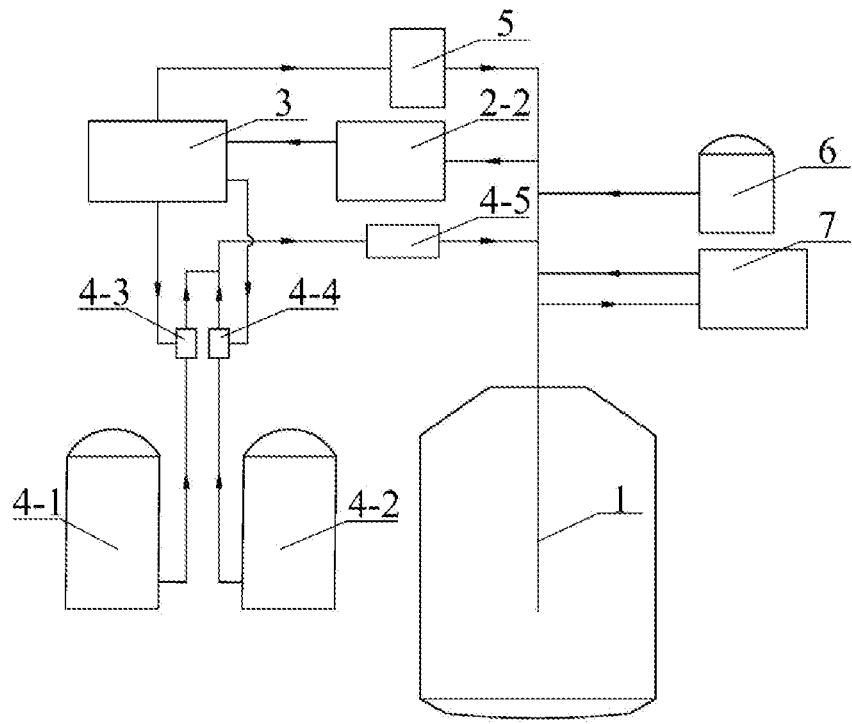
FIG. 1 shows a schematic diagram of a system structure for a method of dynamically controlling a converter $CO_2$—$O_2$ mixed injection smelting fire point area temperature according to the present disclosure.
Figure 2:
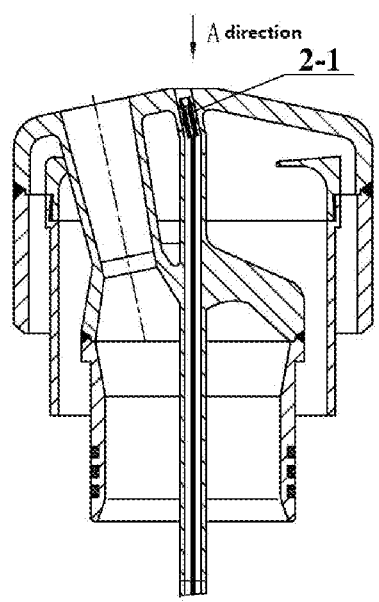
FIG. 2 shows a schematic diagram of assembling of a non-contact infrared thermometer according to the present disclosure.
Figure 3:
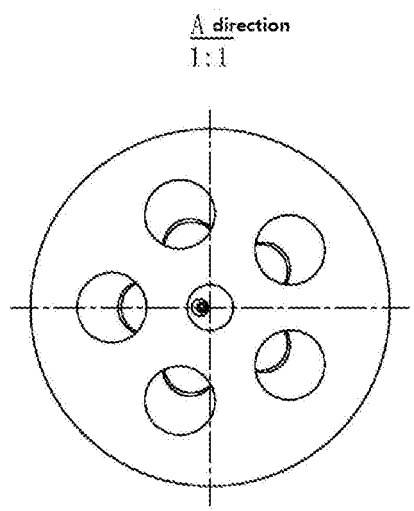
FIG. 3 shows a cross-sectional view along A-direction in FIG. 2.

As shown in FIG. 1, FIG. 2 and FIG. 3, in one embodiment, the method includes installing an infrared thermometer 2-1 inside the oxygen lance 1. The infrared thermometer 2-1 is connected to a data processing system 2-2, the data processing system 2-2 is connected to a secondary smelting system 3, the secondary smelting system 3 is connected to a $CO_2$ flow regulating valve 4-3, an $O_2$ flow regulating valve 4-4 and an oxygen lance control system 5, and the oxygen lance 1 is connected to a thermometer protection system 6 and an oxygen lance cooling system 7. The $CO_2$ flow regulating valve 4-3 is connected to a $CO_2$ gas storage tank 4-1, the $O_2$ flow regulating valve 4-4 is connected to an $O_2$ gas storage tank 4-2, and the pipelines after the $CO_2$ flow regulating valve 4-3 and the $O_2$ flow regulating valve 4-4 are merged into a $CO_2$—$O_2$ gas mixing device 4-5 for gas mixing.

According to the method, during the converter $CO_2$—$O_2$ mixed injection smelting process, the fire point area temperature is measured with the infrared thermometer installed inside the oxygen lance, an electrical signal is transmitted to the data processing system, and a digital signal obtained by processing is transmitted to the secondary smelting system. The $CO_2$ flow regulating valve, the $O_2$ flow regulating valve and the oxygen lance control system are dynamically adjusted according to the change in the fire point area temperature, thereby realizing the dynamic adjustment of the fire point area temperature and the molten pool heating rate, achieving the efficient use of the energy in the converter smelting process, decreasing the consumption of steel materials, and reducing the emissions of steelmaking smoke and dust and the production of slag.

In one embodiment, there is provided a converter $CO_2$—$O_2$ mixed injection smelting method, wherein a converter $CO_2$—$O_2$ mixed injection smelting process includes a smelting beginning stage, a heating and slagging stage, an early efficient dephosphorization stage, a rapid decarburization stage and an endpoint control stage. The converter $CO_2$—$O_2$ mixed injection smelting method includes:

measuring a fire point area temperature in each of the smelting beginning stage, the heating and slagging stage, the early efficient dephosphorization stage, the rapid decarburization stage and the endpoint control stage, so as to control the fire point area temperature and dynamically adjust the $CO_2$ mixing ratio.

In one embodiment, in the smelting beginning stage, the fire point area temperature is measured by the infrared thermometer 2-1 so as to control the fire point area temperature and dynamically adjust the $CO_2$ mixing ratio. For example, in the smelting beginning stage, a fire point area temperature $T_1$ is measured with the infrared thermometer 2-1, wherein the fire point area temperature is to be controlled to below $T_2$. The $CO_2$ mixing ratio is dynamically adjusted based on a difference value $\Delta T$ between $T_1$ and $T_2$. For example, the difference value $\Delta T$ between $T_1$ and $T_2$ is transmitted to the secondary smelting system 3 which dynamically adjusts the $CO_2$ mixing ratio.

In one embodiment, in the heating and slagging stage, the fire point area temperature is measured by the infrared thermometer 2-11 so as to control the fire point area temperature and dynamically adjust the $CO_2$ mixing ratio. For example, the fire point area temperature $T_1$ is measured by the infrared thermometer 2-1, wherein the fire point area temperature is to be controlled to below $T_2=2800°$ C., and the molten pool heating rate is to be controlled to within 10-30° C./min. The secondary smelting system 3 dynamically adjusts the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.5-2.0%.

In one embodiment, in the early efficient dephosphorization stage, the fire point area temperature is measured by the infrared thermometer 2-11 so as to control the molten pool temperature and molten pool heating rate and to dynamically adjust the $CO_2$ mixing ratio. For example, in the early efficient dephosphorization stage, the fire point area temperature is to be controlled to below 2700° C., and the molten pool heating rate is to be controlled to within 5-18° C./min. The secondary smelting system 3 dynamically adjusts the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.35-1.8%.

In one embodiment, in the rapid decarburization stage, the fire point area temperature is measured by the infrared thermometer 2-11 so as to control the molten pool temperature and molten pool heating rate and to dynamically adjust the $CO_2$ mixing ratio. For example, in the rapid decarburization stage, the fire point area temperature $T_1$ is measured by the infrared thermometer 2-1, wherein the fire point area temperature is to be controlled to below $T_2=2700°$ C., and the molten pool heating rate is to be controlled to within 24-40° C./min. The secondary smelting system 3 dynamically adjusts the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.3-1.6%.

In one embodiment, in the endpoint control stage, the fire point area temperature is measured by the infrared thermometer 2-11 so as to control the molten pool temperature and molten pool heating rate and to dynamically adjust the $CO_2$ mixing ratio. For example, in the endpoint control stage, the fire point area temperature $T_1$ is measured by the infrared thermometer 2-1, wherein the fire point area temperature is to be controlled to below $T_2=2800°$ C., and the molten pool heating rate is to be controlled to within 14-30° C./min. The secondary smelting system 3 dynamically adjusts the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.35-2.0%.

In one embodiment, the converter $CO_2$—$O_2$ mixed injection smelting process may further include a preparation stage and an end stage.

In one embodiment, the preparation stage may include calculating an addition amount of a slagging agent and a coolant and formulating an addition system by the secondary smelting system 3 through a material balance and heat balance static model according to a fed metal material condition, a slagging agent condition, a coolant condition and a steel tapping target requirement.

In one embodiment, the preparation stage may further include: subsequent to a metal charging to the converter, rocking a converter mouth to a vertical position, turning on the oxygen lance cooling system 7 by the secondary smelting system, controlling the oxygen lance control system 5 to lower the oxygen lance to a certain height above the converter mouth, turning on the thermometer protection system 6, continuing to lower the oxygen lance to a specified height below the converter mouth, turning on the $CO_2$ flow regulating valve 4-3, the $O_2$ flow regulating valve 4-4 and the infrared thermometer 2-1, and measuring the fire point area temperature with the infrared thermometer 2-1.

In one embodiment, the end stage may include: after the end of blowing, controlling the oxygen lance control system 5 by the secondary smelting system 3 to lift the oxygen lance to a certain height below the converter mouth, turning off the $CO_2$ flow regulating valve 4-3, the $O_2$ flow regulating valve 4-4 and the infrared thermometer 2-1, continuing to lift the oxygen lance to a certain height above the converter mouth, turning off the thermometer protection system 6, lifting the oxygen lance to the initial standby position, turning off the oxygen lance cooling system 7, and waiting for a next cycle of operation.

The converter $CO_2$—$O_2$ mixed injection smelting method may further include rocking the converter for steel tapping after the molten steel composition and temperature are analyzed to be qualified.

The embodiments of the present disclosure further provide a method of dynamically controlling the converter $CO_2$—$O_2$ mixed injection smelting fire point area temperature. Specifically, the method may include at least part of the following steps.

The converter $CO_2$—$O_2$ mixed injection smelting process includes the smelting beginning stage, the heating and slagging stage, the early efficient dephosphorization stage, the rapid decarbonization stage, and the endpoint control stage. The method of dynamically controlling the converter $CO_2$—$O_2$ mixed injection smelting fire point area temperature includes measuring the fire point area temperature in each of the smelting beginning stage, the heating and slagging stage, the early efficient dephosphorization stage, the rapid decarburization stage and the endpoint control stage so as to control the fire point area temperature, transmitting information about the fire point area temperature to the secondary smelting system 3, and dynamically adjusting the $CO_2$ mixing ratio by the secondary smelting system 3. The method is specifically described below.

S1: calculate the addition amount of the slagging agent and the coolant and formulate the addition system by the secondary smelting system 3 through the material balance and heat balance static model according to the fed metal material condition, the slagging agent condition, the coolant condition and the steel tapping target requirement;

S2: subsequent to a metal charging to the converter, rock the converter mouth to a vertical position, turn on the oxygen lance cooling system 7 by the secondary smelting system, control the oxygen lance control system 5 to lower the oxygen lance to a certain height above the converter mouth, turn on the thermometer protection system 6, continue to lower the oxygen lance to a specified height below the converter mouth, turn on the $CO_2$ flow regulating valve 4-3, the $O_2$ flow regulating valve 4-4 and the infrared thermometer 2-1, and measure the fire point area temperature with the infrared thermometer 2-1;

S3: in the smelting beginning stage, measure the fire point area temperature $T_1$ with the infrared thermometer 2-1, wherein the fire point area temperature is to be controlled to below $T_2$, and transmit a difference value $\Delta T$ between $T_1$ and $T_2$ to the secondary smelting system 3 which dynamically adjusts the $CO_2$ mixing ratio;

S4: in the heating and slagging stage which is 0-3 min of the early smelting stage, measure the fire point area temperature $T_1$ with the infrared thermometer 2-1, wherein the fire point area temperature is to be controlled to below $T_2=2800°$ C., and the molten pool heating rate is to be controlled to within 10-30° C./min, dynamically adjust the $CO_2$ mixing ratio in real time by the secondary smelting system 3 based on the difference value $\Delta T$ between $T_1$ and $T_2$ and on the heat balance, wherein in response to the difference value $\Delta T$ changing by 10° C., the $CO_2$ mixing ratio is adjusted by 0.5-2.0%;

S5: in the early efficient dephosphorization stage which is 3-5 min of the early smelting stage, measure the fire point area temperature $T_1$ with the infrared thermometer 2-1, wherein the fire point area temperature is to be controlled to below 2700° C., and the molten pool heating rate is to be controlled to within 5-18° C./min, dynamically adjust the $CO_2$ mixing ratio in real time by the secondary smelting system 3 based on the difference value $\Delta T$ between $T_1$ and $T_2$ and on the heat balance, wherein in response to the difference value $\Delta T$ changing by 10° C., the $CO_2$ mixing ratio is adjusted by 0.35-1.8%;

S6: in the rapid decarburization stage which is 5-10 min of a middle melting stage, measure the fire point area temperature $T_1$ by the infrared thermometer 2-1, wherein the fire point area temperature is to be controlled to below $T_2=2700°$ C., and the molten pool heating rate is to be controlled to within 24-40° C./min, and dynamically adjust the $CO_2$ mixing ratio in real time by the secondary smelting system 3 based on the difference value $\Delta T$ between $T_1$ and $T_2$ and on the heat balance, wherein in response to the difference value $\Delta T$ changing by 10° C., the $CO_2$ mixing ratio is adjusted by 0.3-1.6%;

S7: in the endpoint control stage which is 10-16 min of a late smelting stage, measure the fire point area temperature $T_1$ by the infrared thermometer 2-1, wherein the fire point area temperature is to be controlled to below $T_2=2800°$ C., and the molten pool heating rate is to be controlled to within 14-30° C./min, and dynamically adjust the $CO_2$ mixing ratio in real time by the secondary smelting system 3 based on the difference value $\Delta T$ between $T_1$ and $T_2$ and on the heat balance, wherein in response to the difference value $\Delta T$ changing by 10° C., the $CO_2$ mixing ratio is adjusted by 0.35-2.0%;

S8: after the end of blowing, control the oxygen lance control system 5 by the secondary smelting system 3 to lift the oxygen lance to a certain height below the converter mouth, turn off the $CO_2$ flow regulating valve 4-3, the $O_2$ flow regulating valve 4-4 and the infrared thermometer 2-1, continue to lift the oxygen lance to a certain height above the converter mouth, turn off the thermometer protection system 6, lift the oxygen lance to the initial standby position, turn off the oxygen lance cooling system 7, and wait for a next cycle of operation;

S9: rock the converter for steel tapping after the molten steel composition and temperature are analyzed to be qualified.

A specific embodiment is described below to illustrate. In this embodiment, in order to understand the technical content of the present disclosure, specific technical parameters are given. However, it should be understood that these parameters are not intended to limit the embodiments of the present disclosure. On the contrary, based on the embodiment disclosed below, those skilled in the art may derive other embodiments of the present disclosure.

(1) In this embodiment, the method is applied to 260 t converter steelmaking, an oxygen lance with an outer tube diameter of 402 mm is selected, the top blowing gas is a mixture of $O_2$ and $CO_2$, the total gas flow is 57000 $Nm^3/h$, the outer diameter of the infrared thermometer is 15 mm, the diameter of the nozzle center hole is 30 mm, the protective gas medium is $N_2$ and Ar, $N_2$ is switched to Ar in the late smelting stage, and the protective gas flow is 2500 $Nm^3/h$.

(2) The secondary smelting system 3 calculates the addition amount of the to slagging agent and the coolant and formulates the addition system through the material balance and heat balance static model according to the fed metal material condition (the weight and temperature of molten iron and scrap steel), the slagging agent condition, the coolant condition and the steel tapping target requirement.

The weight of molten iron is 249 t, the weight of scrap steel is 39 t, the addition amount of lime is 35 kg/t, the addition amount of light burnt dolomite is 14.8 kg/t. The molten iron parameters, the scrap steel parameters and the slagging agent parameters are shown in Table 1 and Table 2.

TABLE 1

Parameters of molten iron, scrap steel and molten steel

| Name | C/% | Si/% | Mn/% | P/% | S/% | TEMP/° C. |
|---|---|---|---|---|---|---|
| Molten iron | 4.2 | 0.43 | 0.14 | 0.07 | 0.018 | 1312 |
| Steel scrap | 0.10 | 0.05 | 0.20 | 0.015 | 0.010 | 25 |
| Molten steel | 0.05 | 0.003 | 0.072 | 0.012 | 0.010 | 1670 |

TABLE 2

Composition of slagging agent

| Name | CaO/% | SiO$_2$/% | MgO/% |
|---|---|---|---|
| Lime | 82 | 4 | 3 |
| Light burnt dolomite | 50 | 1 | 35 |

After the converter is loaded with scrap steel and molten iron, the converter mouth is rocked to the vertical position. The secondary smelting system turns on the oxygen lance cooling system. When the water flow is greater than 400 m$^3$/h and the pressure is stable, the secondary smelting system controls the oxygen lance control system to lower the oxygen lance into a movable fume hood above the converter mouth, turns on the thermometer protection system, injects N$_2$ with a flow rate of 800 Nm$^3$/h, continues to lower the oxygen lance to 500 mm lower than the converter mouth, turns on the O$_2$ flow regulating valve and the infrared thermometer, where the O$_2$ flow rate is 57000 Nm$^3$/h, adjusts the flow of the thermometer protective gas N$_2$ to 2500 Nm$^3$/h, then continues to lower the oxygen lance to 2.3 m away from the blowing position, and adds 50% slagging agent.

The early smelting stage (0-3 min) is the heating and slagging stage. When the blowing begins, the infrared thermometer measures an electrical signal with a dual laser sighting device. The computer processing system converts the electrical signal into the fire point area temperature $T_1$=2980° C., which is 180° C. higher than the fire point area temperature to be controlled (2800° C.). The secondary smelting system calculates the CO$_2$ mixing amount according to the heat balance, then turns on the CO$_2$ flow regulating valve, and dynamically adjusts the CO$_2$ mixing ratio to 9.4%. In the continuous monitoring process, in response to ΔT changing by 10° C., the CO$_2$ mixing ratio is adjusted by 0.52% (the early temperature limits the reaction rate of CO$_2$ and [C], and the utilization rate of CO$_2$ is relatively low). The fire point area temperature is stably controlled to below 2800° C., and the average heating rate of the molten pool is controlled at 19° C./min (in the early stage, [Si], [Mn], [P] and [Fe] elements react with O$_2$ to generate heat, resulting in rapid temperature rise of the molten pool).

The early smelting stage (3-5 min) is the early efficient dephosphorization stage, where the fire point area temperature is controlled to below 2700° C., and the average heating rate of the molten pool is controlled at 10° C./min. 3 minutes after the smelting began, the infrared thermometer measured the fire point area temperature $T_1$=2790° C., which is 90° C. higher than the fire point area temperature to be controlled (2700° C.). The secondary smelting system calculates the CO$_2$ mixing amount according to the heat balance, and dynamically adjusts the CO$_2$ mixing ratio to 12.3%. In the continuous monitoring process, in response to ΔT changing by 10° C., the CO$_2$ mixing ratio is adjusted by 0.41% (due to the rising temperature, the CO$_2$ utilization rate increases), which reduces iron oxidation and the production of smoke and dust while providing "low temperature" thermodynamic conditions for the early dephosphorization.

The smelting process then enters the rapid decarburization stage (5-11 min). [C] in the molten pool is rapidly oxidized, which not only causes an increase of the fire point area temperature and the molten pool heating rate, but also generates a large amount of smoke and dust. However, due to the high temperature and [C] concentration in the molten pool, it is beneficial to increase the CO$_2$ reaction rate. In order to ensure that the tapping temperature meets the requirements, the fire point area temperature is controlled to below 2700° C. (the CO production in this stage is large, thus the fire point area temperature needs to be controlled lower to effectively suppress the production of smoke and dust), and the average heating rate of the molten pool is controlled at 30° C./min. 5 minutes after the smelting began, the infrared thermometer measured the fire point area temperature $T_1$=2690° C., which is 10° C. lower than the fire point area temperature to be controlled (2700° C.). The secondary smelting system calculates the CO$_2$ mixing amount according to the heat balance and dynamically adjusts the CO$_2$ mixing ratio to 9.6%. In the continuous monitoring process, in response to ΔT changing by 10° C., the CO$_2$ mixing ratio is adjusted by 0.32% (the melting pool temperature and [C] concentration are higher relative to the early smelting stage, which is helpful to increase the CO$_2$ reaction rate).

The final smelting stage (11-15 min) is the endpoint control stage, in which the main task is to control the composition and temperature of the molten steel to meet the requirements of steel tapping. In order to ensure the temperature and composition of the steel tapping, the fire point area temperature is controlled to below 2800° C., and the average heating rate of the molten pool is controlled at 22.5° C./min. 11 min after the smelting began, the infrared thermometer measured the fire point area temperature $T_1$=2680° C., which is 20° C. lower than the fire point area temperature to be controlled (2700° C.). The secondary smelting system calculates the CO$_2$ mixing amount according to the heat balance and dynamically adjusts the CO$_2$ mixing ratio to 10.8%. In the continuous monitoring process, in response to ΔT changing by 10° C., the CO$_2$ mixing ratio is adjusted by 0.36% ([C] concentration in the molten pool in this stage limits the reaction of CO$_2$ with [C], the CO$_2$ utilization rate decreases, and it is necessary to strengthen the molten pool stirring in order to reduce [Fe] oxidation and increase the metal yield).

After the end of the blowing, the secondary smelting system controls the oxygen lance control system to lift the oxygen lance to 500 mm below the converter mouth, and turns off the CO$_2$ flow regulating valve, the O$_2$ flow regulating valve and the infrared thermometer, then continues to lift the oxygen lance into the cooling fume hood above the converter mouth, turns off the thermometer protection system, continues to lift the oxygen lance to the initial standby position, and turns off the oxygen lance cooling system.

After the molten steel composition and temperature are analyzed to be qualified by using sub-lance or other analysis methods, the converter is rocked for steel tapping.

Figure 4:
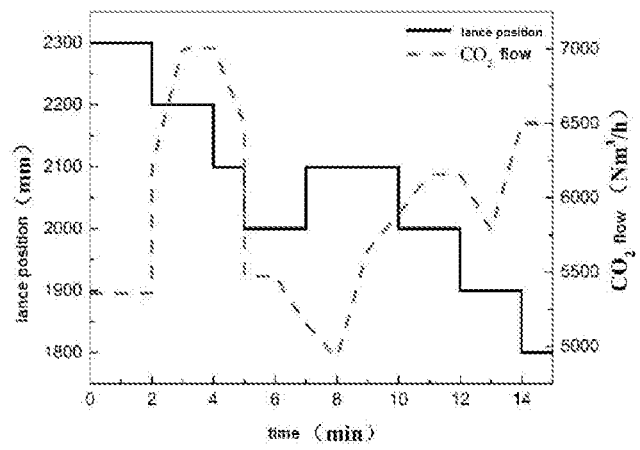
FIG. 4 shows a change curve of oxygen lance position and $CO_2$ flow during the smelting process according to the embodiments of the present disclosure.

The change curve of the oxygen lance position and the $CO_2$ flow during the above smelting process is shown in FIG. 4.

By using the method of the present disclosure, the converter smoke and dust emission is reduced by 8.2%, the gas recovery amount is increased by 5.9 m³/t, and the steel material consumption is reduced by 2.4 kg/t.

The above are multiple embodiments of the present disclosure. It should be noted that for those ordinary skilled in the art, without departing from the principles described in the present disclosure, several improvements and retouches can be made. These improvements and retouches should also be regarded as the scope of protection of the present disclosure.

The invention claimed is:

1. A converter $CO_2$—$O_2$ mixed injection smelting method, wherein a converter $CO_2$—$O_2$ mixed injection smelting process comprises a smelting beginning stage, a heating and slagging stage, a dephosphorization stage, a rapid decarburization stage, and an endpoint control stage; and wherein the converter $CO_2$—$O_2$ mixed injection smelting method comprises:
   measuring a fire point area temperature in each of the smelting beginning stage, the heating and slagging stage, the dephosphorization stage, the rapid decarburization stage and the endpoint control stage, so as to dynamically adjust a $CO_2$ mixing ratio,
   wherein the method further comprises:
   in the smelting beginning stage, measuring a fire point area temperature $T_1$, wherein the fire point area temperature is to be controlled to below $T_2$, and the $CO_2$ mixing ratio is dynamically adjusted based on a difference value $\Delta T$ between $T_1$ and $T_2$, and/or
   in the heating and slagging stage, measuring the fire point area temperature TL wherein the fire point area temperature is to be controlled to below $T_2$=2800° C., and a molten pool heating rate is to be controlled to within 10-30° C./min, and dynamically adjusting the $CO_2$ mixing ratio in real time based on the difference value $\Delta T$ between $T_1$ and $T_2$ and on a heat balance, wherein in response to the difference value $\Delta T$ changing by 10° C., the $CO_2$ mixing ratio is adjusted by 0.5-2.0%; and/or
   in the dephosphorization stage, measuring the fire point area temperature, wherein the fire point area temperature is to be controlled to below 2700° C., and the molten pool heating rate is to be controlled to within 5-18° C./min, and dynamically adjusting the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.35-1.8%; and/or
   in the rapid decarburization stage, measuring the fire point area temperature $T_1$, wherein the fire point area temperature is to be controlled to below $T_2$=2700° C., and the molten pool heating rate is to be controlled to within 24-40° C./min, and dynamically adjusting the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.3-1.6%; and/or
   in the endpoint control stage, measuring the fire point area temperature $T_1$, wherein the fire point area temperature is to be controlled to below $T_2$=2800° C., and the molten pool heating rate is to be controlled to within 14-30° C./min, and dynamically adjusting the $CO_2$ mixing ratio in real time based on the difference value $\Delta T$ between $T_1$ and $T_2$ and on the heat balance, wherein in response to the difference value $\Delta T$ changing by 10° C., the $CO_2$ mixing ratio is adjusted by 0.35-2.0%.

2. The converter $CO_2$—$O_2$ mixed injection smelting method according to claim 1, wherein the converter $CO_2$—$O_2$ mixed injection smelting process further comprises a preparation stage; and wherein the converter $CO_2$—$O_2$ mixed injection smelting method further comprises:
   calculating an addition amount of a slagging agent and a coolant and formulating an addition system through a material balance and heat balance static model according to a fed metal material condition, a slagging agent condition, a coolant condition and a steel tapping target requirement; and/or
   subsequent to a metal charging to the converter, lowering an oxygen lance to a specified height below a converter mouth, introducing a flow of $CO_2$ and $O_2$, controlling the flow of $CO_2$ and $O_2$, and measuring the fire point area temperature.

3. The converter $CO_2$—$O_2$ mixed injection smelting method according to claim 1, wherein the converter $CO_2$—$O_2$ mixed injection smelting process further comprises an end stage; and wherein the converter $CO_2$—$O_2$ mixed injection smelting method further comprises:
   lifting an oxygen lance to a certain height below the converter mouth, turning off the flow of $CO_2$ and $O_2$, continuing to lift the oxygen lance to a certain height above the converter mouth, and waiting for a next cycle of operation.

4. The converter $CO_2$—$O_2$ mixed injection smelting method according to claim 1, further comprising: rocking the converter for steel tapping after molten steel composition and temperature are analyzed to be qualified.

5. The converter $CO_2$—$O_2$ mixed injection smelting method according to claim 1, further comprising: installing an infrared thermometer inside an oxygen lance to measure the fire point area temperature.

6. The converter $CO_2$—$O_2$ mixed injection smelting method according to claim 5, wherein the infrared thermometer is connected to a data processing system, the data processing system is connected to a secondary smelting system, the secondary smelting system is connected to a $CO_2$ flow regulating valve, an $O_2$ flow regulating valve and an oxygen lance control system, and the oxygen lance is connected to a thermometer protection system and an oxygen lance cooling system.

7. The converter $CO_2$—$O_2$ mixed injection smelting method according to claim 2, wherein the metal material condition in the preparation stage comprises a weight and temperature of molten iron and scrap steel.

8. The converter $CO_2$—$O_2$ mixed injection smelting method according to claim 6, wherein a gas supply flow of the oxygen lance is 6000-100000 Nm³/h, where an $O_2$ concentration is greater than 97%, an $O_2$ mixing ratio is 50-100%, a $CO_2$ concentration is greater than 90%, and the $CO_2$ mixing ratio is 0-50%; and wherein a water flow of the oxygen lance cooling system is 60-600 m³/h.

9. The converter $CO_2$—$O_2$ mixed injection smelting method according to claim 6, wherein the infrared thermometer transmits an electrical signal of 4-20 mA; wherein the infrared thermometer has an infrared spectrum of 4-30 μm, a single laser or dual laser sighting form, and a meter outer diameter of 5-40 mm; and wherein an angle between an infrared axis and a nozzle-orifice axis of the oxygen lance is 0-70°.

10. The converter $CO_2$—$O_2$ mixed injection smelting method according to claim 6, wherein: the thermometer protection system controls a temperature of the infrared thermometer to within 0-70° C., a protective gas medium is any one or a mixture of any two or more of $N_2$, Ar and $CO_2$, a protective gas flow is 500-10000 $Nm^3/h$, and a protective gas pipeline inner diameter is 5-200 mm.

11. The converter $CO_2$—$O_2$ mixed injection smelting method according to claim 6, wherein the data processing system converts the electrical signal of 4-20 mA into a digital signal.

12. The converter $CO_2$—$O_2$ mixed injection smelting method according to claim 1, wherein the method is applicable to 30-400 t converter $CO_2$—$O_2$ mixed injection smelting.

13. A method of dynamically controlling a converter $CO_2$—$O_2$ mixed injection smelting fire point area temperature, wherein a converter $CO_2$—$O_2$ mixed injection smelting process comprises a smelting beginning stage, a heating and slagging stage, a dephosphorization stage, a rapid decarburization stage and an endpoint control stage; and
wherein the method of dynamically controlling the converter $CO_2$—$O_2$ mixed injection smelting fire point area temperature comprises: measuring a fire point area temperature in each of the smelting beginning stage, the heating and slagging stage, the dephosphorization stage, the rapid decarburization stage and the endpoint control stage, so as to dynamically adjust a $CO_2$ mixing ratio,
wherein the method further comprising installing an infrared thermometer inside the oxygen lance, wherein the infrared thermometer is connected to a data processing system, the data processing system is connected to a secondary smelting system, the secondary smelting system is connected to a $CO_2$ flow regulating valve, an $O_2$ flow regulating valve and an oxygen lance control system, and the oxygen lance is connected to a thermometer protection system and an oxygen lance cooling system; wherein the method comprises one or more of:
in the smelting beginning stage, measuring a fire point area temperature $T_1$ with the infrared thermometer, wherein the fire point area temperature is to be controlled to below $T_2$, and transmitting a difference value $\Delta T$ between $T_1$ and $T_2$ to the secondary smelting system which dynamically adjusts the $CO_2$ mixing ratio; and/or
in the heating and slagging stage which is 0-3 min of an early smelting stage, measuring the fire point area temperature $T_1$ with the infrared thermometer, wherein the fire point area temperature is to be controlled to below $T_2=2800°$ C., and a molten pool heating rate is to be controlled to within 10-30° C./min, and dynamically adjusting the $CO_2$ mixing ratio in real time by the secondary smelting system based on the difference value $\Delta T$ between $T_1$ and $T_2$ and on a heat balance, wherein in response to the difference value $\Delta T$ changing by 10° C., the $CO_2$ mixing ratio is adjusted by 0.5-2.0%; and/or
in the dephosphorization stage which is 3-5 min of the early smelting stage, measuring the fire point area temperature $T_1$ with the infrared thermometer, wherein the fire point area temperature is to be controlled to below $T_2=2700°$ C., and the molten pool heating rate is to be controlled to within 5-18° C./min, and dynamically adjusting the $CO_2$ mixing ratio in real time by the secondary smelting system based on the difference value $\Delta T$ between $T_1$ and $T_2$ and on the heat balance, wherein in response to the difference value $\Delta T$ changing by 10° C., the $CO_2$—$O_2$ mixing ratio is adjusted by 0.35-1.8%; and/or
in the rapid decarburization stage which is 5-10 min of a middle melting stage, measuring the fire point area temperature $T_1$ by the infrared thermometer, wherein the fire point area temperature is to be controlled to below $T_2=2700°$ C., and the molten pool heating rate is to be controlled to within 24-40° C./min, and dynamically adjusting the $CO_2$ mixing ratio in real time by the secondary smelting system based on the difference value $\Delta T$ between $T_1$ and $T_2$ and on the heat balance, wherein in response to the difference value $\Delta T$ changing by 10° C., the $CO_2$ mixing ratio is adjusted by 0.3-1.6%; and/or
in the endpoint control stage which is 10-16 min of a late smelting stage, measuring the fire point area temperature $T_1$ with the infrared thermometer, wherein the fire point area temperature is to be controlled to below $T_2=2800°$ C., and the molten pool heating rate is to be controlled to within 14-30° C./min, and dynamically adjusting the $CO_2$ mixing ratio in real time by the secondary smelting system based on the difference value $\Delta T$ between $T_1$ and $T_2$ and on the heat balance, wherein in response to the difference value $\Delta T$ changing by 10° C., the $CO_2$ mixing ratio is adjusted by 0.35-2.0%.

14. The method of dynamically controlling the converter $CO_2$—$O_2$ mixed injection smelting fire point area temperature according to claim 13, further comprising:
calculating an addition amount of a slagging agent and a coolant and formulating an addition system by the secondary smelting system through a material balance and heat balance static model according to a fed metal material condition, a slagging agent condition, a coolant condition and a steel tapping target requirement; and/or
subsequent to a metal charging to the converter, rocking a converter mouth to a vertical position, turning on the oxygen lance cooling system by the secondary smelting system, controlling the oxygen lance control system to lower the oxygen lance to above the converter mouth, turning on the thermometer protection system, continuing to lower the oxygen lance to a specified height below the converter mouth, turning on the $CO_2$ flow regulating valve, the $O_2$ flow regulating valve and the infrared thermometer, and measuring the fire point area temperature with the infrared thermometer; and/or
after an end of blowing, controlling the oxygen lance control system by the secondary smelting system to lift the oxygen lance to below the converter mouth, turning off the $CO_2$ flow regulating valve, the $O_2$ flow regulating valve and the infrared thermometer, continuing to lift the oxygen lance to above the converter mouth, turning off the thermometer protection system, lifting the oxygen lance to an initial standby position, turning off the oxygen lance cooling system, and waiting for a next cycle of operation; and/or
rocking the converter for steel tapering after molten steel composition and temperature are analyzed to be qualified.

15. The method of dynamically controlling the converter $CO_2$—$O_2$ mixed injection smelting fire point area temperature according to claim 14, wherein the metal material condition in the preparation stage comprises a weight and temperature of molten iron and scrap steel.

16. The method of dynamically controlling the converter $CO_2$—$O_2$ mixed injection smelting fire point area temperature according to claim 14, wherein a gas supply flow of the oxygen lance is 6000-100000 $Nm^3/h$, where an $O_2$ concentration is greater than 97%, an $O_2$ mixing ratio is 50-100%, a $CO_2$ concentration is greater than 90%, and the $CO_2$ mixing ratio is 0-50%; and wherein a water flow of the oxygen lance cooling system is 60-600 $m^3/h$.

17. The method of dynamically controlling the converter $CO_2$—$O_2$ mixed injection smelting fire point area temperature according to claim 16, wherein the infrared thermometer transmits an electrical signal of 4-20 mA; wherein the infrared thermometer has an infrared spectrum of 4-30 μm, a single laser or dual laser sighting form, and a meter outer diameter of 5-40 mm; and wherein an angle between an infrared axis and a nozzle-orifice axis of the oxygen lance is 0-70°.

18. The method of dynamically controlling the converter $CO_2$—$O_2$ mixed injection smelting fire point area temperature according to claim 14, wherein: the thermometer protection system controls a temperature of the infrared thermometer to within 0-70° C., a protective gas medium is any one or a mixture of any two or more of $N_2$, Ar and $CO_2$, a protective gas flow is 500-10000 $Nm^3/h$, and a protective gas pipeline inner diameter is 5-200 mm; or wherein the data processing system converts the electrical signal of 4-20 mA into a digital signal.

* * * * *